(12) United States Patent
Wittenmark et al.

(10) Patent No.: US 10,531,373 B2
(45) Date of Patent: Jan. 7, 2020

(54) APAPRATUS AND METHOD FOR ADAPTIVE DISCOVERY SIGNAL MEASUREMENT TIMING CONFIGURATION

(71) Applicant: Telefonaktiebolaget LM Ericsson (publ), Stockholm (SE)

(72) Inventors: Emma Wittenmark, Lund (SE); Peter Alriksson, Horby (SE); David Sugirtharaj, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/769,827

(22) PCT Filed: Aug. 18, 2016

(86) PCT No.: PCT/EP2016/069584
§ 371 (c)(1),
(2) Date: Apr. 20, 2018

(87) PCT Pub. No.: WO2017/067688
PCT Pub. Date: Apr. 27, 2017

(65) Prior Publication Data
US 2018/0324683 A1   Nov. 8, 2018

Related U.S. Application Data

(60) Provisional application No. 62/245,636, filed on Oct. 23, 2015.

(51) Int. Cl.
*H04W 48/16* (2009.01)
*H04W 56/00* (2009.01)
*H04W 74/08* (2009.01)

(52) U.S. Cl.
CPC ......... *H04W 48/16* (2013.01); *H04W 56/001* (2013.01); *H04W 74/0808* (2013.01)

(58) Field of Classification Search
CPC ............. H04W 48/16; H04W 74/0808; H04W 56/001; H04L 27/00; H04L 5/001; H04L 5/0053; H04J 11/0093
See application file for complete search history.

(56) References Cited

U.S. PATENT DOCUMENTS

2017/0070312 A1*  3/2017  Yi .................. H04J 11/0069
2017/0279585 A1*  9/2017  Yang ..................... H04J 11/00
2018/0220459 A1*  8/2018  Park ........................ H04L 1/18

OTHER PUBLICATIONS

3GPP TS 36.211 V11.4.0, Sep. 2013, 3rd Generation Partnership Project; Technical Specification Group Radio Access Network; Evolved Universal Terrestrial Radio Access (E-UTRA); Physical channels and modulation, Release 11, 120 pages.
(Continued)

*Primary Examiner* — Jae Y Lee
(74) *Attorney, Agent, or Firm* — Leffler Intellectual Property Law, PLLC

(57) ABSTRACT

Disclosed herein is a method implemented in a network node configured to operate in a wireless network for adjusting the length of a search window, in which a wireless communication device is required to search for signals from other network nodes. The method comprises the steps of determining a degree of synchronization of the network, estimating an expected delay to acquire a channel within the network, determining a search window length and informing the wireless communication device of the determined search window length. Also disclosed herein is an arrangement of a network node and a computer program product.

29 Claims, 9 Drawing Sheets

(56) References Cited

OTHER PUBLICATIONS

3GPP TS 36.213 V11.4.0, Sep. 2013, 3rd Generation Partnership Project; Technical Specification Group Radio Access Network; Evolved Universal Terrestrial Radio Access (E-UTRA); Physical layer procedures, Release 11, 182 pages.

3GPP TS 36.331 V11.5.0, Sep. 2013, 3rd Generation Partnership Project; Technical Specification Group Radio Access Network; Evolved Universal Terrestrial Radio Access (E-UTRA); Radio Resource Control (RRC); Protocol specification, Release 11, 347 pages.

PCT International Search Report, dated Nov. 11, 2016, in connection with International Application No. PCT/EP2016/069584, all pages.

PCT Written Opinion, dated Nov. 11, 2016, in connection with International Application No. PCT/EP2016/069584, all pages.

3GPP TSG RAN WG1 Meeting #76bis, R1-141416, Shenzhen, China, Mar. 31-Apr. 4, 2014, ZTE, "Discovery Burst Indicator for Autonomous Time Difference Detection", 4 pages.

3GPP TSG RAN WG1 Meeting #81, R1-152866, Fukuoka, Japan, May 25-29, 2015, Samsung, "Discussion on LAA DRS design", 8 pages.

3GPP TSG RAN WG1 Meeting #78, R1-143170, Dresden, Germany, Aug. 18-22, 2014, LG Electronics, "DRS-based measurement procedures with network assistance", 7 pages.

3GPP TSG RAN WG1 Ad-hoc Meeting, R1-151131, Paris, France, Mar. 24-26, 2015, Ericsson, "Further Details on LBT Design in DL for LAA", 7 pages.

3GPP TSG RAN WG1 Meeting #81, R1-153015, Fukuoka, Japan, May 25-29, 2015, ZTE, "On DRS and initial signal in LAA", 5 pages.

3GPP TSG RAN WG1 Meeting #81, R1-153011, Fukuoka, Japan, May 25-29, 2015, ZTE, "Overview on PHY layer options for LAA design", 5 pages.

* cited by examiner

Cell/TP 1

Cell/TP 2

APAPRATUS AND METHOD FOR ADAPTIVE DISCOVERY SIGNAL MEASUREMENT TIMING CONFIGURATION

TECHNICAL FIELD

The present invention relates generally to the field of wireless communication. More particularly, it relates to adaptive timing configuration of discovery signal measurements in wireless communication networks.

BACKGROUND

The 3GPP initiative "License Assisted Access" (LAA) intends to allow LTE (Long Term Evolution) equipment to also operate in the unlicensed radio spectrum such as the 5 GHz band. The unlicensed spectrum is used as a complement to the licensed spectrum. Accordingly, User Equipment (UE) devices connect in the licensed spectrum (primary cell or PCell) and use carrier aggregation to benefit from additional transmission capacity in the unlicensed spectrum (secondary cell or SCell). To reduce the changes required for aggregating licensed and unlicensed spectrum, the LTE frame timing in the primary cell is simultaneously used in the secondary cell.

In addition to LAA operation, it should be possible to run LTE fully on the unlicensed band without the support from the licensed band. This is called LTE-U Stand Alone. Another variant of the LTE-U Stand Alone is further standardized in the MultiFire Alliance.

Regulatory requirements, however, may not permit transmissions in the unlicensed spectrum without prior channel sensing. Since the unlicensed spectrum must be shared with other radio devices of similar or dissimilar wireless technologies, a so called listen-before-talk (LBT) method needs to be applied. Today, the unlicensed 5 GHz spectrum is mainly used by equipment implementing the IEEE 802.11 Wireless Local Area Network (WLAN) standard. This standard is known under its marketing brand "Wi-Fi."

The LBT procedure leads to uncertainty at the base station or node (eNB) regarding whether it will be able to transmit (a) DownLink (DL) subframe(s) or not. This leads to a corresponding uncertainty at the UE as to whether it actually has a subframe to decode or not. An analogous uncertainty exists in the UpLink (UL) direction where the eNB is uncertain if the UEs scheduled on the SCell actually made a transmission or not.

LTE uses OFDM (Orthogonal Frequency Division Multiplexing) in the downlink and (Discrete Fourier Transform) DFT-spread OFDM (also referred to as single-carrier Frequency Division Multiple Access, FDMA) in the uplink. The basic LTE downlink physical resource can thus be seen as a time-frequency grid as illustrated in FIG. 1, where each resource element 110 corresponds to one OFDM subcarrier during one OFDM symbol interval. The uplink subframe has the same subcarrier spacing as the downlink and the same number of single carrier frequency division multiple access (SC-FDMA) symbols in the time domain as OFDM symbols in the downlink. Each OFDM symbol 110 comprises a cycling prefix 120.

In the time domain, LTE downlink transmissions are organized into radio frames of 10 ms, each radio frame consisting of ten equally-sized subframes of length Tsubframe=1 ms as shown in FIG. 2. For normal cyclic prefix, one subframe consists of 14 OFDM symbols. The duration of each symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminal(s) data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3

From LTE Rel-11 onwards, above described resource assignments can also be scheduled on the enhanced Physical Downlink Control Channel (ePDCCH). For Rel-8 to Rel-10 only Physical Downlink Control Channel (PDCCH) is available.

The reference symbols shown in the above FIG. 3 are the cell specific reference symbols (CRS) and are used to support multiple functions including fine time and frequency synchronization and channel estimation for certain transmission modes.

The PDCCH/ePDCCH is used to carry downlink control information (DCI) such as scheduling decisions and power-control commands. More specifically, the DCI includes:
  Downlink scheduling assignments, including PDSCH resource indication, transport format, hybrid-ARQ information, and control information related to spatial multiplexing (if applicable). A downlink scheduling assignment also includes a command for power control of the PUCCH used for transmission of hybrid-ARQ acknowledgements in response to downlink scheduling assignments.
  Uplink scheduling grants, including PUSCH resource indication, transport format, and hybrid-ARQ-related information. An uplink scheduling grant also includes a command for power control of the PUSCH.
  Power-control commands for a set of terminals as a complement to the commands included in the scheduling assignments/grants.

One PDCCH/ePDCCH carries one DCI message containing one of the groups of information listed above. As multiple terminals can be scheduled simultaneously, and each terminal can be scheduled on both downlink and uplink simultaneously, there must be a possibility to transmit multiple scheduling messages within each subframe. Each scheduling message is transmitted on separate PDCCH/ePDCCH resources, and consequently there are typically multiple simultaneous PDCCH/ePDCCH transmissions within each subframe in each cell. Furthermore, to support different radio-channel conditions, link adaptation can be used, where the code rate of the PDCCH/ePDCCH is selected by adapting the resource usage for the PDCCH/ePDCCH, to match the radio-channel conditions.

Here follows a discussion on the start symbol for PDSCH and ePDCCH within the subframe. The OFDM symbols in the first slot are numbered from 0 to 6. For transmissions modes 1-9, the starting OFDM symbol in the first slot of the subframe for ePDCCH can be configured by higher layer signaling and the same is used for the corresponding scheduled PDSCH. Both sets have the same ePDCCH starting symbol for these transmission modes. If not configured by higher layers, the start symbol for both PDSCH and ePDCCH is given by the CFI value signaled in PCFICH.

Multiple OFDM starting symbol candidates can be achieved by configuring the UE in transmission mode 10, by having multiple ePDCCH PRB configuration sets where for each set the starting OFDM symbol in the first slot in a subframe for ePDCCH can be configured by higher layers to be a value from {1,2,3,4}, independently for each ePDCCH set. If a set is not higher layer configured to have a fixed start symbol, then the ePDCCH start symbol for this set follows the CFI value received in PCFICH.

The LTE Rel-10 standard supports bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation (CA). CA implies that an LTE Rel-10 terminal can receive multiple CC, where the CC have, or at least the possibility to have, the same structure as a Rel-8 carrier. CA is illustrated in FIG. 4. A CA-capable UE is assigned a primary cell (PCell) which is always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a key feature of carrier aggregation is the ability to perform cross-carrier scheduling. This mechanism allows a (e)PDCCH on one CC to schedule data transmissions on another CC by means of a 3-bit Carrier Indicator Field (CIF) inserted at the beginning of the (e)PDCCH messages. For data transmissions on a given CC, a UE expects to receive scheduling messages on the (e)PDCCH on just one CC—either the same CC, or a different CC via cross-carrier scheduling; this mapping from (e)PDCCH to PDSCH is also configured semi-statically.

This UE performs periodic cell search and RSRP and RSRQ measurements in RRC Connected mode. It is responsible for detecting new neighbor cells, and for tracking and monitoring already detected cells. The detected cells and the associated measurement values are reported to the network. Reports to the network can be configured to be periodic or aperiodic based a particular event.

To share the channel in the unlicensed spectrum, the LAA SCell cannot occupy the channel indefinitely. One of the mechanisms for interference avoidance and coordination among small cells is SCell ON/OFF feature. In Rel-12 LTE, discovery signals were introduced to provide enhanced support for SCell ON/OFF operations. Specifically, these signals are introduced to handle potentially severe interference situations (particularly on the synchronization signals) resulting from dense deployment as well as to reduce UE inter-frequency measurement complexity.

The discovery signals in a DRS (Discovery Reference Signal) occasion are comprised of the primary synchronization signal (PSS), secondary synchronization signal (SSS), common reference signal (CRS), and when configured, the channel state information reference signals (CSI-RS). The PSS and SSS are used for coarse synchronization, when needed, and for cell identification. The CRS is used for fine time and frequency estimation and tracking and may also be used for cell validation, i.e., to confirm the cell ID detected from the PSS and SSS. The CSI-RS is another signal that can be used in dense deployments for cell or transmission point identification. FIG. 5 shows the presence of these signals in a DRS occasion of length equal to two subframes and also shows the transmission of the signals over two different cells or transmission points.

The DRS occasion corresponding to transmissions from a particular cell may range in duration from one to five subframes for FDD and two to five subframes for TDD. The subframe in which the SSS occurs marks the starting subframe of the DRS occasion. This subframe is either subframe 0 or subframe 5 in both FDD and TDD. In TDD, the PSS appears in subframe 1 and subframe 6 while in FDD the PSS appears in the same subframe as the SSS. The CRS are transmitted in all downlink subframes and downlink pilot time slot (DwPTS) regions of special subframes.

The discovery signals should be useable by the UE for performing cell identification, reference signal received power (RSRP) and reference signal received quality (RSRQ) measurements. The RSRP measurement definition based on discovery signals is the same as in prior releases of LTE. The RSSI measurement is defined as an average over all OFDM symbols in the downlink parts of the measured subframes within a DRS occasion. The RSRQ is then defined as $$DRSRQ = N \times DRSRP/DRSSI,$$

where N is the number of PRBs used in performing the measurement, DRSRP is the RSRP measurement based on the discovery signals and DRSSI is the RSSI measured over the DRS occasion.

In Rel-12, RSRP measurements based on the CRS and CSI-RS in the DRS occasions and RSRQ measurements based on the CRS in the DRS occasions have been defined. As stated earlier, discovery signals can be used in a small cell deployment where the cells are being turned off and on or in a general deployment where the on/off feature is not being used. For instance, discovery signals could be used to make RSRP measurements on different CSI-RS configurations in the DRS occasion being used within a cell, which enables the detection of different transmission points in a shared cell.

When measurements are made on the CSI-RS in a DRS occasion, the UE restricts its measurements to a list of candidates sent to the UE by the network via RRC signaling. Each candidate in this list contains a physical cell ID (PCID), a virtual cell ID (VCID) and a subframe offset indicating the duration (in number of subframes) between the subframe where the UE receives the CSI-RS and the subframe carrying the SSS. This information allows the UE to limit its search. The UE correlates to the received signal candidates indicated by the radio resource control (RRC)

signal and reports back any CSI-RS RSRP values that have been found to meet some reporting criterion, e.g., exceeding a threshold value.

When a UE is being served on multiple carrier frequencies via a PCell and one or more SCells, the UE needs to perform radio resource management (RRM) measurements on other cells on the currently used carrier frequencies (intra-frequency measurements) as well as on cells on other carrier frequencies (inter-frequency measurements). Since the discovery signals are not transmitted continuously, the UE needs to be informed about the timing of the discovery signals so as to manage its search complexity. Furthermore, when a UE is being served on as many carrier frequencies as it is capable of supporting and inter-frequency RRM measurements need to be performed on a different carrier frequency that is not currently being used, the UE is assigned a measurement gap pattern. This gap pattern on a serving frequency allows the UE to retune its receiver for that frequency to the other frequency on which measurements are being performed. During this gap duration, the UE cannot be scheduled by the eNB on the current serving frequency. Knowledge of the timing of the discovery signals is especially important when the use of such measurement gaps is needed. Beyond mitigating UE complexity, this also ensures that the UE is not unavailable for scheduling for prolonged periods of time on the current serving frequencies (PCell or SCell).

The provision of such timing information is done via a discovery measurement timing configuration (DMTC) that is signaled to the UE. The DMTC provides a window with a duration of 6 ms occurring with a certain periodicity and timing within which the UE may expect to receive discovery signals. The duration of 6 ms is the same as the measurement gap duration as defined currently in LTE and allows the measurement procedures at the UE for discovery signals to be harmonized regardless of the need for measurement gaps. Only one DMTC is provided per carrier frequency including the current serving frequencies. The UE can expect that the network will transmit discovery signals so that all cells that are intended to be discoverable on a carrier frequency transmit discovery signals within the DMTCs. Furthermore, when measurement gaps are needed, it is expected that the network will ensure sufficient overlap between the configured DMTCs and measurement gaps.

Turning to Wireless Local Area Networks, in typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several APs using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the listen before talk (LBT) mechanism is shown in FIG. 6.

There are several versions of LBT thus far classified in Release 13. These are
1. Category 1: No LBT
   No LBT procedure is performed by the transmitting entity.
2. Category 2: LBT without random back-off
   The duration of time that the channel is sensed to be idle before the transmitting entity transmits is deterministic.
3. Category 3: LBT with random back-off with a contention window of fixed size
   The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.
4. Category 4: LBT with random back-off with a contention window of variable size
   The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

Regarding Carrier Selection, as there is a large available bandwidth of unlicensed spectrum, carrier selection is required for LAA nodes to select the carriers with low interference and with that achieve good co-existence with other unlicensed spectrum deployments. For any technology, when deploying an additional node, the first rule for achieving high-performance for the new node itself as well as for the existing nodes is to scan the available channels and select one that would receive least interference for the node itself and cause least interference to existing nodes.

The basic principle behind carrier selection is for the eNB to scan and sense channels for interference or radar detection, and configure the SCell frequency accordingly based on the outcome of its carrier selection algorithm. The carrier selection process is separate and on a different time scale from the LBT/CCA procedure prior to transmissions on the unlicensed channels. It is expensive to move all attached UEs to another carrier frequency due to the signaling required and interruptions in the data flow.

Autonomous, semi-static carrier selection can be based on the eNB sensing of the averaged interference level, potential presence of radar signals if required, and traffic load on the candidate carriers over a relatively longer time scale. Once a suitable set of carriers is identified, they are added and activated as SCells for UEs. This process may be repeated periodically over tens or hundreds of milliseconds in order to keep reassessing the interference environment, and the associated measurements do not need any new specifications. Once a set of carriers is activated after the carrier selection process, transmissions can be performed dynamically on one or more of them based on LBT and fast DTX.

For Licensed assisted access (LAA) to unlicensed spectrum using LTE, up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Therefore, a new study item has been initiated in 3GPP on extending LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 7, a UE is connected to a Primary Cell, PCell, in the licensed band and one or more Secondary Cells, SCells, in the unlicensed band. In this application we denote a secondary cell in unlicensed spectrum as license assisted secondary cell (LA SCell).

Recently there have also been proposals to operate LTE in unlicensed spectrum without the aid of a licensed carrier. In such a standalone operation in unlicensed spectrum using LTE, the PCell will also operate on the unlicensed carrier and thus essential control signals and channels will also be subject to unmanaged interference and LBT.

LTE mobility, i.e. to maintain a connection while the UE is moving between different network nodes, is typically done on the PCell. When the PCell is operating in unlicensed spectrum the signals used for mobility (typically PSS/SSS and CRS) are typically transmitted rather sparsely, e.g. in the DRS occasion. In addition they are all subject to LBT and thus their presence is not guaranteed.

Further the rather dense system information broadcast messages that are typically transmitted on the PCell will also need to be transmitted more sparsely and under LBT constraints.

Network synchronization refers to the degree of time- and frequency synchronization the network nodes have. The degree of synchronization typically varies from:
- Tight, enough for advanced transmission techniques, which in today's LTE system is on µs level
- Coarse synchronization, enough for aligning e.g. DRS occasions with DMTC windows and measurement gaps, typically on ms level
- No synchronization Using a fixed size DMTC window of 6 ms is not suitable either for systems that need to perform clear channel assessment before transmitting or networks with varying degree of eNB time (or frequency) synchronization.

For systems subject to LBT, the expected delay to access the channel depends on the interference level from other nodes, thus using a fixed window not suitable. If the window is set large enough to cater for the worst possible delay, UE power consumption will suffer because the UE is required to look for neighbor cells throughout the window. On the other hand, if the window is set too small, the UE might fail to detect some neighbor cells, potentially leading to bad mobility performance.

For systems with varying degree of synchronization, the DMTC window need to be set to guarantee that all neighbor cells DRS transmissions fall into the window. For a network (NW) without any synchronization this would imply that the DMTC window size would need to be equal to the DRS period. If the DMTC window size is fixed, a UE in a network with at least some degree of synchronization would not be able to benefit because the window size would need to be set based on the worst case (no synchronization).

Therefore, there is a need for methods, and arrangements for configuring the timing without suffering from the problems mentioned above.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

The proposed solution is to dynamically (but slowly) adjust the DMTC window size based on the expected LBT delay and/or the degree of synchronization in the NW.

The length of the DMTC window can both be conveyed to the UE through dedicated signaling and/or broadcasted system information.

One embodiment relates to a method implemented in a network node for adaptive discovery signal measurement timing configuration, the method comprising: assessing the expected channel access delay; assessing the degree of NW synchronization; determining a suitable DMTC window length; notifying UEs in RRC Connected state about the change; updating system information with the new DMTC window configuration; and paging UEs to reread system information.

One embodiment relates to an arrangement, such as a network node, for adaptive discovery signal measurement timing configuration, the arrangement being configured for assessing the expected channel access delay; assessing the degree of NW synchronization; determining a suitable DMTC window length; notifying UEs in RRC Connected state about the change; updating system information with the new DMTC window configuration; and paging UEs to reread system information.

It is an object of some embodiments to obviate at least some of the above disadvantages and to provide a method and an arrangement.

According to a first aspect this is achieved by a method as disclosed in the embodiments.

The method according to the first aspect may e.g. be a method implemented in a network node configured to operate in a wireless network for adjusting the length of a search window, in which a wireless communication device is required to search for signals from other network nodes.

The method comprises the steps of determining a degree of synchronization of the network, estimating an expected delay to acquire a channel within the network, determining a search window length and informing the wireless communication device of the determined search window length.

In some embodiments, determining the degree of synchronization of the network may be based on which synchronization method the network uses.

The synchronization method may e.g. be based on global navigation satellite system (GNSS). It may be radio interface based synchronization (RIBS) where the eNB receives signals from other eNBs over the air and synchronizes itself in relation to the signals. The synchronization may also utilize precision time protocol (PTP) and/or network time protocol (NTP).

In some embodiments, determining the degree of synchronization of the network may be based on measurements of the degree of synchronization using e.g. signals from other network nodes.

The other signals may e.g. be primary synchronization signals (PSS), secondary synchronization signals (SSS) and/or cell specific reference signals (CRS).

In some embodiments, determining the degree of synchronization of the network may be based on measurements performed by the wireless communication device of relative timing between nodes. The nodes may e.g. be different network nodes and/or eNBs. For instance, the wireless communication device may monitor the timing of neighboring cells, e.g. by means of PSS/SSS/CRS. The timing information may then be reported back to the eNB. The monitoring and reporting may also be extended to neighboring cells.

In some embodiments, estimating the expected delay to acquire the channel may be based on historical clear channel assessment success rate.

The network node may e.g. collect and store information on how often it performs a clear channel assessment, and how often the channel is clear. The information may then constitute a history of statistics which the network node may utilize when estimating the expected delay. For instance, if the history shows that the success rate is above a certain threshold, e.g. 70% success rate, then the network node may determine that there is not much delay, and the length of the search window may be set to be relatively short i.e. being in e.g. a 1-5 ms range.

In some embodiments, estimating the expected delay to acquire the channel is based on a measured interference level.

The network node may e.g. measure received signal received strength (RSSI) or received signal, received quality (RSRQ) in order to determine the interference level of the channel. If the interference level is high, the network node may set the length of the search window to be long, such as 6-10 ms, and vice versa. A high value may e.g. be above −72 dBm/20 Mhz.

In some embodiments, estimating the expected delay to acquire the channel may be based on measured channel occupancy of other nodes.

The network node may thus take into consideration network parameters of other networks or network nodes in order to assess its own delay. For instance, if neighboring nodes experience congestion or heavy traffic, the network node may determine that its own network or channel will experience similar conditions or be in other ways affected by the surroundings and thus set the length of the search window to be longer e.g. in the 5-10 ms range. If, on the other hand, neighboring nodes experience low traffic and little or no congestion, the network node may determine that the risk of delay is small and set the length of the search window to be short, e.g. in the 1-5 ms range.

In some embodiments, determining the search window length may be made by taking the degree of synchronization into account.

In some embodiments, determining the search window length may be made by taking the expected delay to acquire the channel into account.

In some embodiments, determining the search window length may be made by taking a target success rate for transmission of control signals in the search window into account.

In some embodiments, the wireless communication device is in RRC connected state and is notified about a change of the search window length, using dedicated signaling (e.g. a RRC Connection Reconfiguration message).

In some embodiments, the wireless communication device is in RRC IDLE state and is notified about a change of search window length, wherein a system information is updated with the determined search window length, and wherein informing the wireless communication device of the search window length is done by paging the wireless device using broadcast signaling to reread the system information.

In some embodiments, the search window may be a long term evolution—LTE-discovery signal measurement timing configuration—DMTC-window.

In some embodiments, the control signal may be a discovery reference signal—DRS.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

In some embodiments, the data-processing unit may further comprise a memory configured to store the program instructions when the computer program is loaded into the data processing unit.

In some embodiments, the data processing-unit may further comprise a processor configured to cause the execution of the method according to the first aspect when the computer program is run by the data processing unit.

According to a third aspect this is achieved by an arrangement, such as an eNB as disclosed in the embodiments.

An arrangement according to the third aspect may e.g. be of a network node configured to adjust the length of a search window, in which a wireless communication device is required to search for signals from other network nodes.

The arrangement comprises a controller configured to determining a degree of synchronization of the network, estimating an expected delay to acquire a channel within the network, determining a search window length and informing the wireless communication device of the determined search window length.

In some embodiments, the arrangement may further comprise a synchronization unit, a delay estimator and a window length determiner.

In some embodiments, the controller may further be configured to cause determination of the degree of synchronization of the network based on which synchronization method the network uses. The controller may e.g. cause the synchronization unit to estimate or determine the degree of synchronization of the network based on which synchronization method the network use.

In some embodiments, the controller may be further configured to cause determination of the degree of synchronization of the network based on measurements of the degree of synchronization using e.g. signals from other network nodes. The controller may e.g. cause the synchronization unit to determine the degree of synchronization of the network based on measurements of the degree of synchronization using e.g. signals from other network nodes.

In some embodiments, the controller may further be configured to cause determination of the degree of synchronization of the network based on measurements performed by the wireless communication device of relative timing between nodes. The controller may e.g. be configured to cause the synchronization unit to determine the degree of synchronization of the network based on measurements performed by the wireless communication device of relative timing between nodes.

In some embodiments, the controller may further be configured to cause estimation of the expected delay to acquire the channel based on historical clear channel assessment success rate. The controller may e.g. be configured to cause the delay estimator to estimate the expected delay to acquire the channel based on historical clear channel assessment success rate.

In some embodiments, the controller may further be configured to cause estimation of expected delay to acquire the channel based on a measured interference level. The controller may e.g. cause the delay estimator to estimate the expected delay to acquire the channel based on a measured interference level.

In some embodiments, the controller may further be configured to cause estimation of expected delay to acquire the channel based on measured channel occupancy of other nodes. The controller may e.g. cause the delay estimator to estimate the expected delay to acquire the channel based on measured channel occupancy of other nodes.

In some embodiments, the controller may further be configured to cause determination of the search window length by taking the degree of synchronization into account.

In some embodiments, the controller may further be configured to cause determination of the search window length by taking the expected delay to acquire the channel into account.

In some embodiments, the controller may further be configured to cause determination of the search window length by taking a target success rate for transmission of control signals in the search window into account.

In some embodiments, the wireless communication device is in radio resource control—RRC-Connected state and is notified about a change of the search window length, wherein the controller is further configured to cause the information of the wireless communication device of the search window length by using dedicated signaling.

In some embodiments, the wireless communication device is in radio resource control—RRC-IDLE state and is notified about a change of the search window length, wherein the controller is configured to update a system information with the determined search window length, and wherein the controller is further configured to cause the information of the wireless communication device of the search window length by paging the wireless communication device using broadcast signaling to reread the system information.

In some embodiments, the search window may be a long term evolution—LTE-discovery signal measurement timing configuration—DMTC-window.

In some embodiments, the control signal may be a discovery reference signal—DRS.

A fourth aspect is a network node comprising the arrangement according to the third aspect.

In some embodiments, the third and fourth aspect may additionally share or have identical features as any of the various features described for the first aspect.

The methods and apparati disclosed herein solves the drawbacks discussed in the background section by dynamically (but slowly) adjust the DMTC window size based on the expected LBT delay and/or the degree of synchronization in the NW.

The length of the DMTC window can both be conveyed to the UE through dedicated signaling and/or broadcasted system information.

The following advantages have been identified:
1. Reduced UE power consumption in situations where the interference situation from other nodes allows it
2. Reduced UE power consumption in situations where the degree of NW synchronization allows it
3. Reduced risk of mobility performance degradations due to a bad interference situation

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described. In the described embodiments, reduced power consumption and stable mobility performance is enabled for a wireless communication device by means of a variable discovery maintenance timing configuration (DMTC) window length. The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Figure 1:
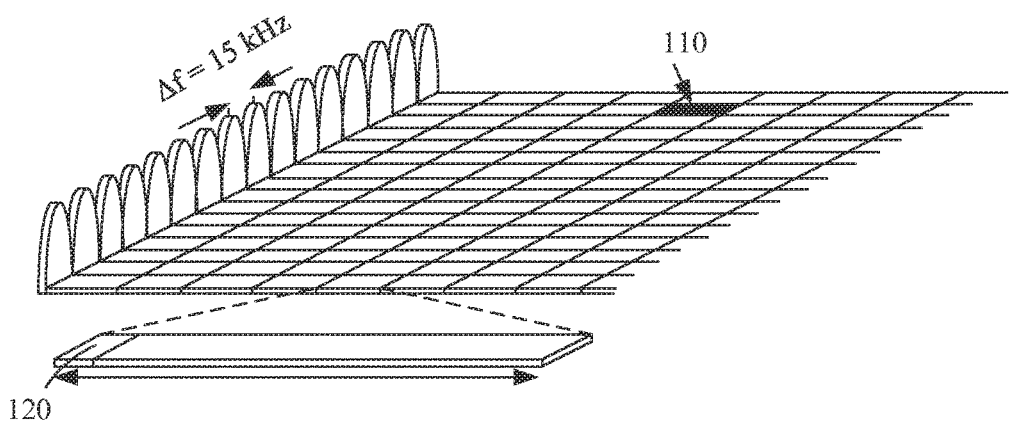
FIG. 1 is a schematic drawing illustrating an LTE downlink physical resource.
Figure 2:
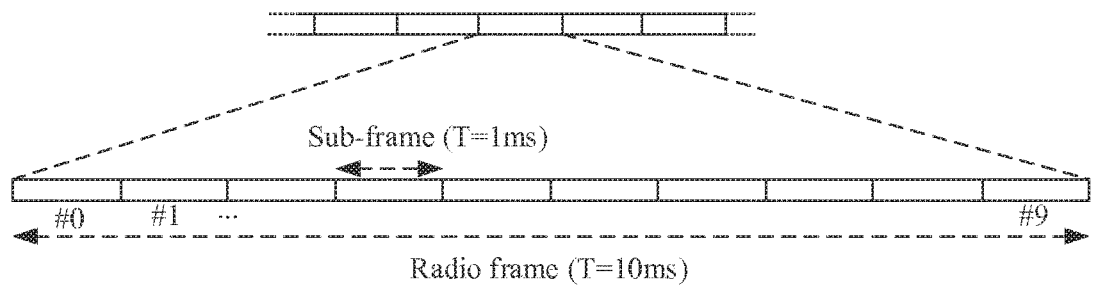
FIG. 2 illustrates an LTE time-domain structure.
Figure 3:
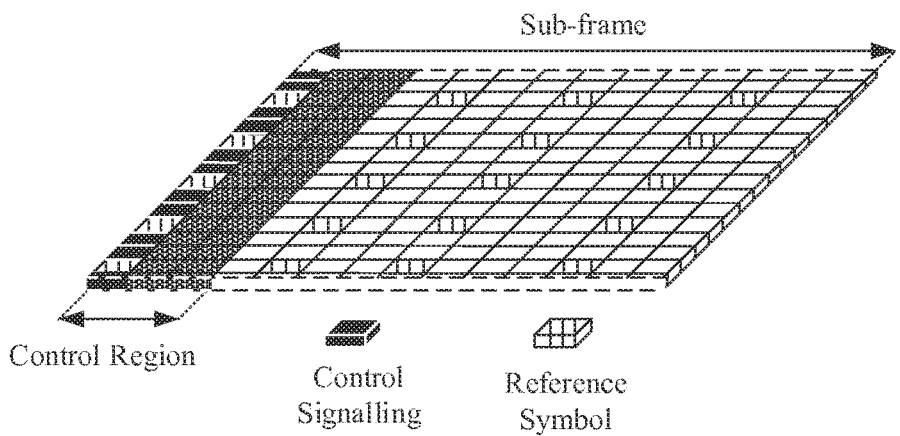
FIG. 3 illustrates a normal downlink subframe.
Figure 4:
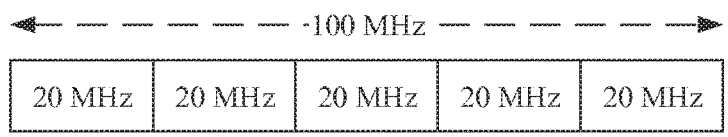
FIG. 4 is an illustration of carrier aggregation.
Figure 5:
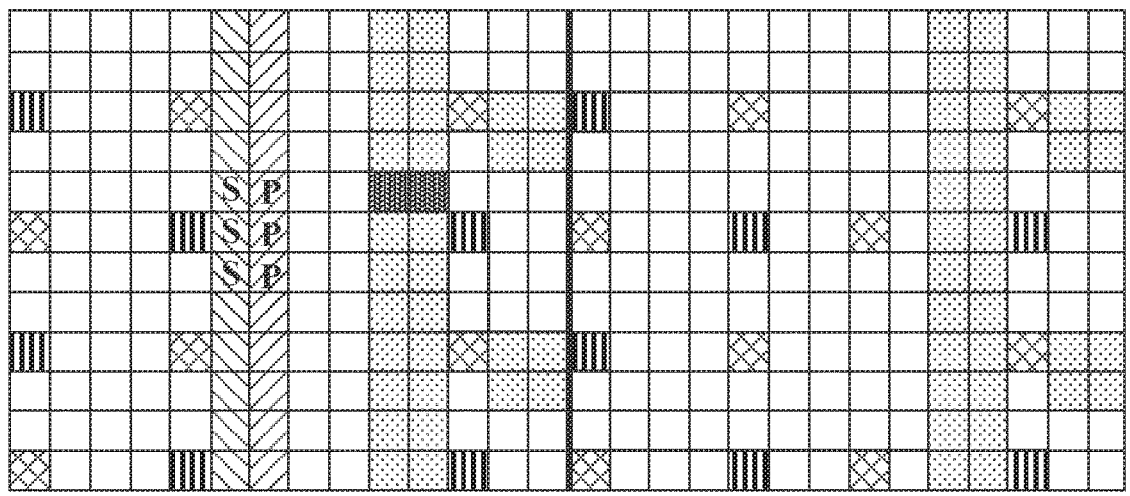
FIG. 5 is an illustration of small cell overview of on/off via SCell activation/deactivation.
Figure 5:
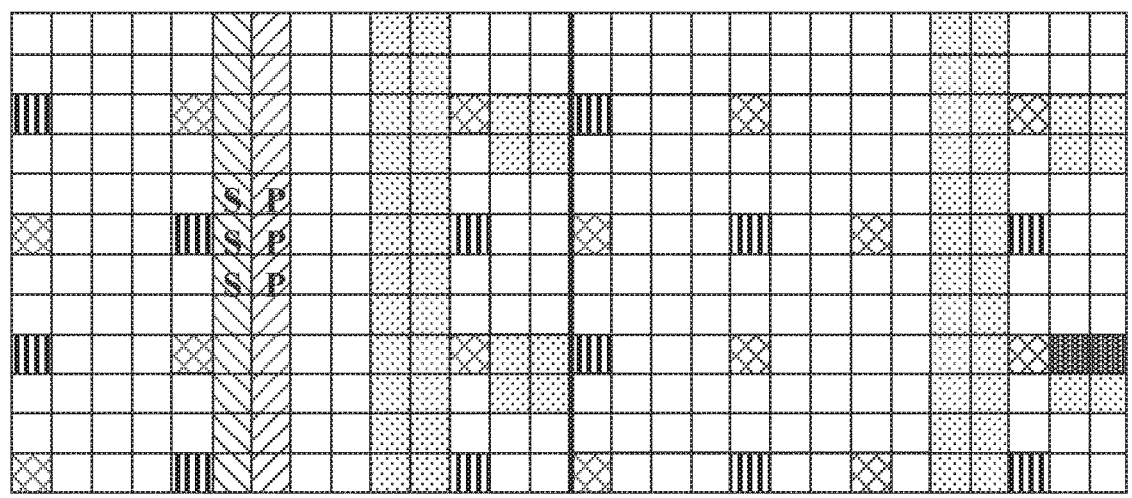
Figure 6:
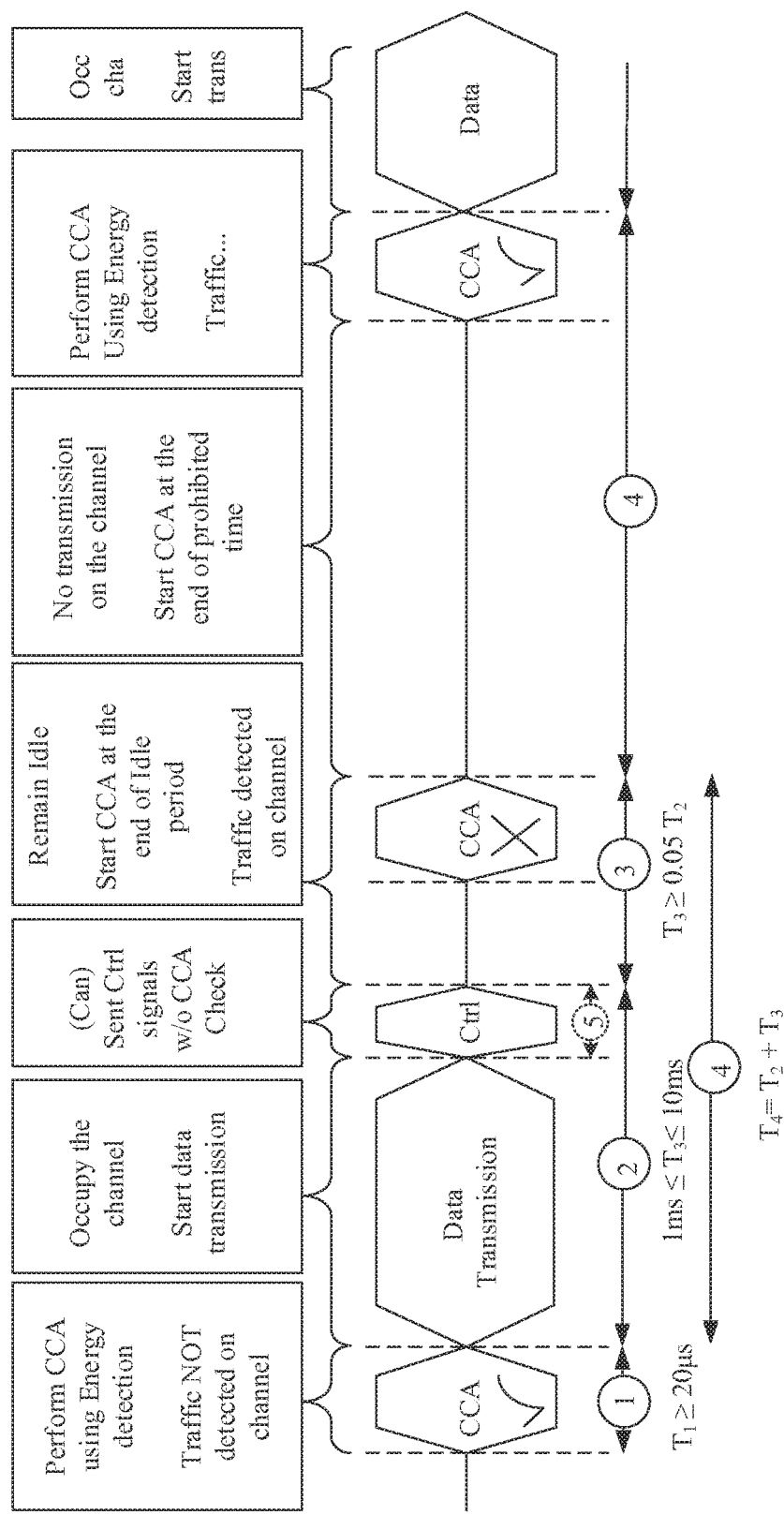
FIG. 6 is a schematic drawing illustrating a Listen Before Talk procedure.
Figure 7:
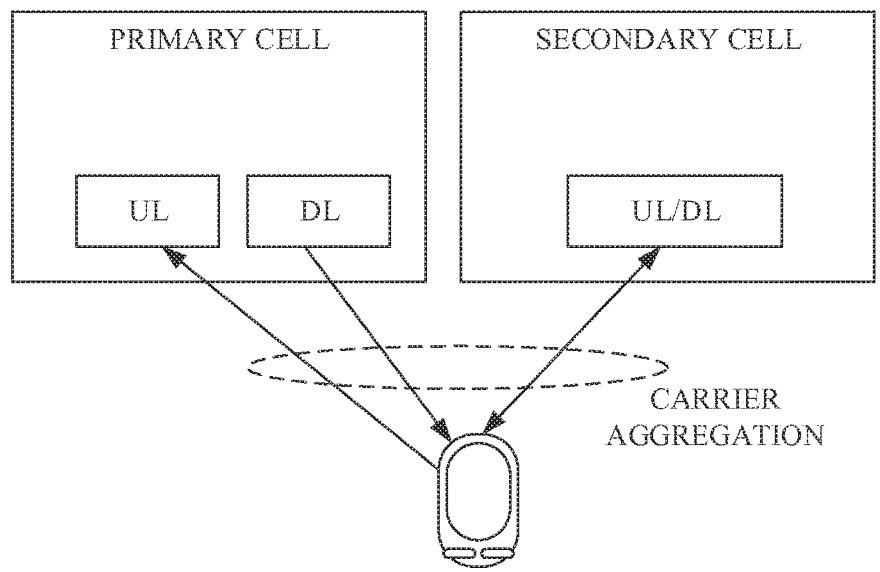
FIG. 7 is a schematic drawing illustrating Licensed-assisted access (LAA) to unlicensed spectrum using LTE carrier aggregation.
Figure 8:
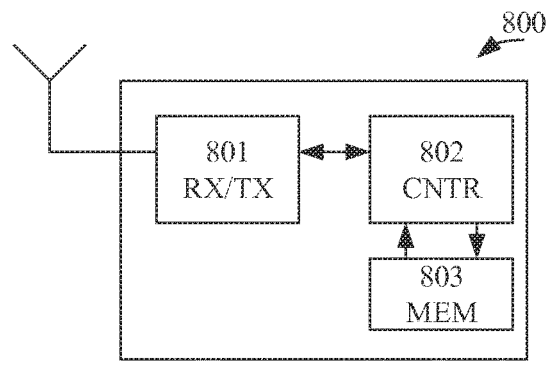
FIG. 8 is a schematic drawing illustrating an example arrangement for use in a user equipment according to some embodiments.

FIG. 8 illustrates an example arrangement for use in a user equipment for implementing a method as taught herein according to some embodiments. The UE 800 comprises a transceiver (RX/TX) 801, a controller (CNTR) 802, and a memory 803 MEM. The transceiver 801 may in some embodiments be a separate transmitter and a separate receiver. The controller 802 is configured to receive and transmit data through the transceiver, which data may be stored in the memory 803, and to execute any of the methods taught herein. In some embodiments, the controller 802 may be configured to cause the transceiver 801 to receive a notification from a network node when the UE is in a radio resource control—RRC—Connected state about a change of a DMTC configuration comprising the suitable DMTC window length;

The controller 801 may further cause the UE to read network system information again upon reception of a paging from the network node.

Figure 9:
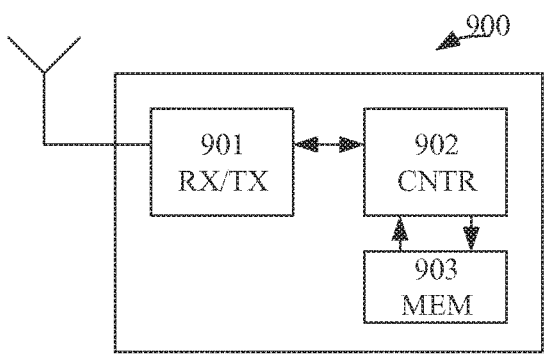
FIG. 9 is a schematic drawing illustrating an example arrangement for use in a base station according to some embodiments.

FIG. 9 illustrates an example arrangement for use in a base station eNB according to some embodiments. Example eNB 900 comprises a transceiver (RX/TX) 901, a controller (CNTR) 702, and a memory (MEM) 903. The transceiver 901 may in some embodiments be a separate transmitter and a separate receiver. The controller 902 is configured to receive and transmit data through the transceiver, which data may be stored in the memory 903, and to execute any of the methods taught herein.

In some embodiments, the arrangement may further comprise a synchronization unit, a delay estimator and a window length determiner.

The controller may e.g. cause the synchronization unit to estimate or determine the degree of synchronization of the network based on which synchronization method the network use.

In some embodiments, the controller may cause the synchronization unit to determine the degree of synchronization of the network based on measurements of the degree of synchronization using e.g. signals from other network nodes.

In some embodiments, the controller may be configured to cause the synchronization unit to determine the degree of synchronization of the network based on measurements performed by the wireless communication device of relative timing between nodes.

In some embodiments, the controller may be configured to cause the delay estimator to estimate the expected delay to acquire the channel based on historical clear channel assessment success rate.

In some embodiments, the controller may cause the delay estimator to estimate the expected delay to acquire the channel based on a measured interference level.

In some embodiments, the controller may cause the delay estimator to estimate the expected delay to acquire the channel based on measured channel occupancy of other nodes.

Figure 10:
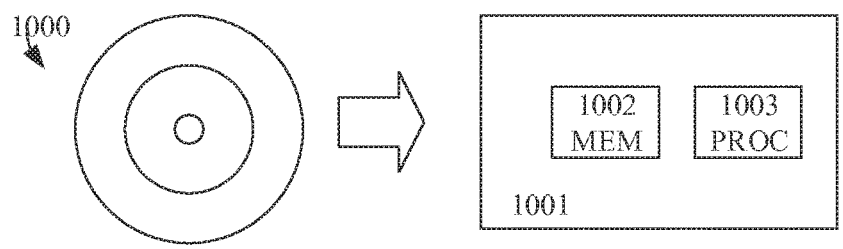
FIG. 10 is a schematic drawing illustrating a computer program product according to some embodiments.
Figure 11:
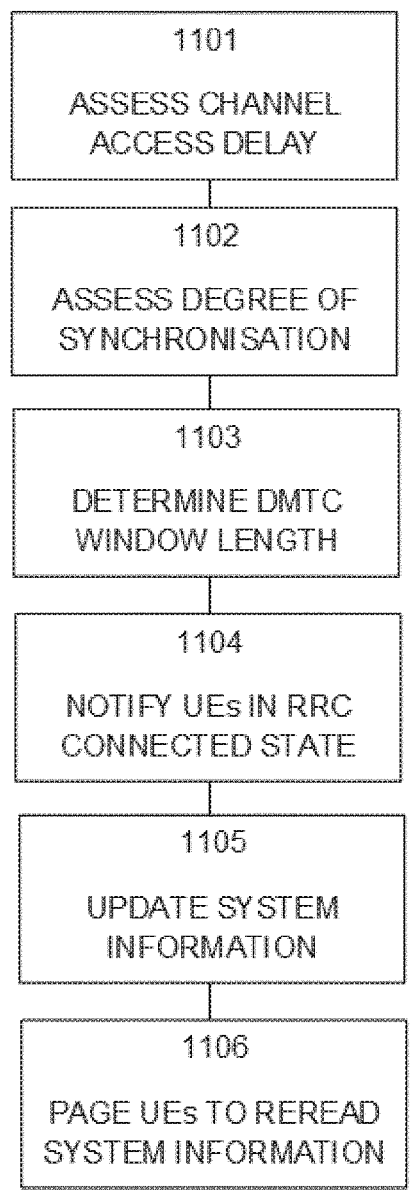
FIG. 11 is a flow chart showing a method according to one embodiment of the teachings disclosed herein.

FIG. 10 illustrates an example computer program product program according to some embodiments. According to some embodiments, computer program product comprises a computer readable medium 900 such as, for example, a diskette or a CD-ROM. The computer readable medium may have stored thereon a computer program comprising program instructions. The computer program may be loadable into a data-processing unit 1001, which may, for example, be comprised in a mobile terminal. When loaded into the data-processing unit, the computer program may be stored in a memory (MEM) 1002 associated with or integral to the data-processing unit (PROC) 1003. According to some embodiments, the computer program may, when loaded into and run by the data-processing unit, cause the data-processing unit to execute method steps according to, for example, the methods disclosed herein such as that shown FIG. 11. The method is to be implemented in an eNB and the method comprises the following steps:

1101. assess the expected channel access delay
    1102. assess the degree of NW synchronization
    1103. Determine a suitable DMTC window length
    1104. Notify UEs in RRC Connected state about the change
    1105. Update system information with the new DMTC window configuration
    1106. Page UEs to reread system information In one embodiment the expected channel access delay is estimated based on statistics of previous channel accesses.

In another embodiment the expected channel access delay is estimated based on measurements of the channel e.g. channel occupancy or average received power.

In another embodiment, the network has a target DRS transmission success rate that is required to achieve good mobility and UE power consumption performance. The DMTC window is adjusted to achieve this target. If the DRS transmission success is less than the set target, the DMTC window length is increased.

In one embodiment the degree of NW synchronization is known from the deployment and/or which synchronization method the NW uses.

In another embodiment the degree of NW synchronization is estimated based on measurements, e.g. of the backhaul connection or of signals transmitted by other nodes over the air interface.

In yet another embodiment the degree of NW synchronization is estimated based on measurements, performed by the UE(s), of relative timing between nodes.

In one embodiment the DMTC window length is determined according to:

1. The starting point is chosen as the timing of the serving cell's DRS occasion minus half of the synchronization margin.

For instance, if the NW nodes are synchronized within +/−1 ms, the synchronization margin is 2 ms. However, a person skilled in the are will easily realize that the interval does not have to be symmetric. For instance, a synchronization within −1 ms and +2 ms will result in a synchronization margin of 3 ms. Other values are of course possible.

2. The end point is chosen as the timing of the serving cell's DRS occasion plus half of the synchronization margin plus the LBT margin.

The LBT margin is e.g. the time difference between the DRS nominal transmission time and the estimated maximal delay due to LBT taking any restrictions concerning in which subframe the DRS may be transmitted into account.

The procedure is exemplified in FIGS. 12 to 15 where a dark rectangle denotes the nominal DRS occasion (subframe 0, 1201, 1301, 1401, 1501) and a light rectangle (1202, 1302, 1402, 1502) a possible (but not nominal) DRS occasion. In these examples each rectangle represents an LTE subframe. The three rows represent three different cells and the top row is the serving cell.

Figure 12:
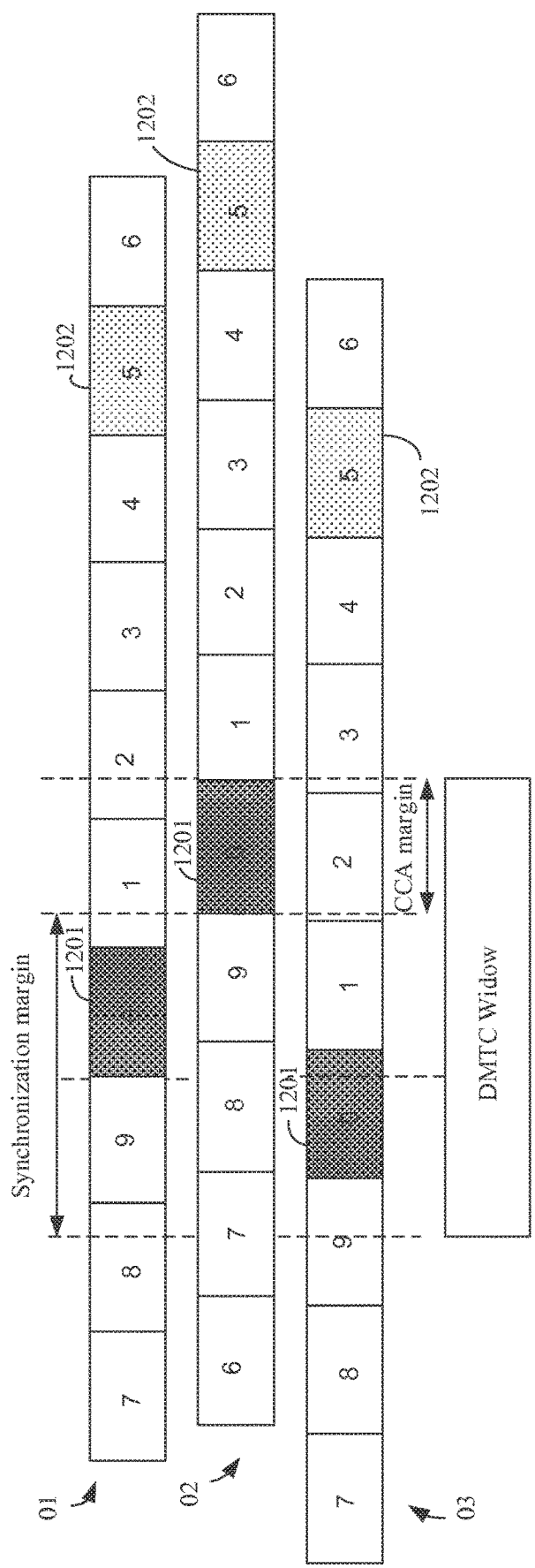
FIG. 12 is a schematic drawing illustrating a timing situation where LBT success is high and thus the LBT margin is equal to the length of the DRS occasion according to one embodiment of the teachings disclosed herein.

FIG. 12 shows an example where the LBT success probability is high and thus the LBT margin is equal to the length of the DRS occasion. The NW is synchronized within +/−1.2 ms. The LBT probability is very high (estimated by load measurements or historical LBT success statistics), thus it is expected that the DRS can be transmitted in its nominal position and the LBT margin is just the length of the DRS (i.e. one subframe).

Figure 13:
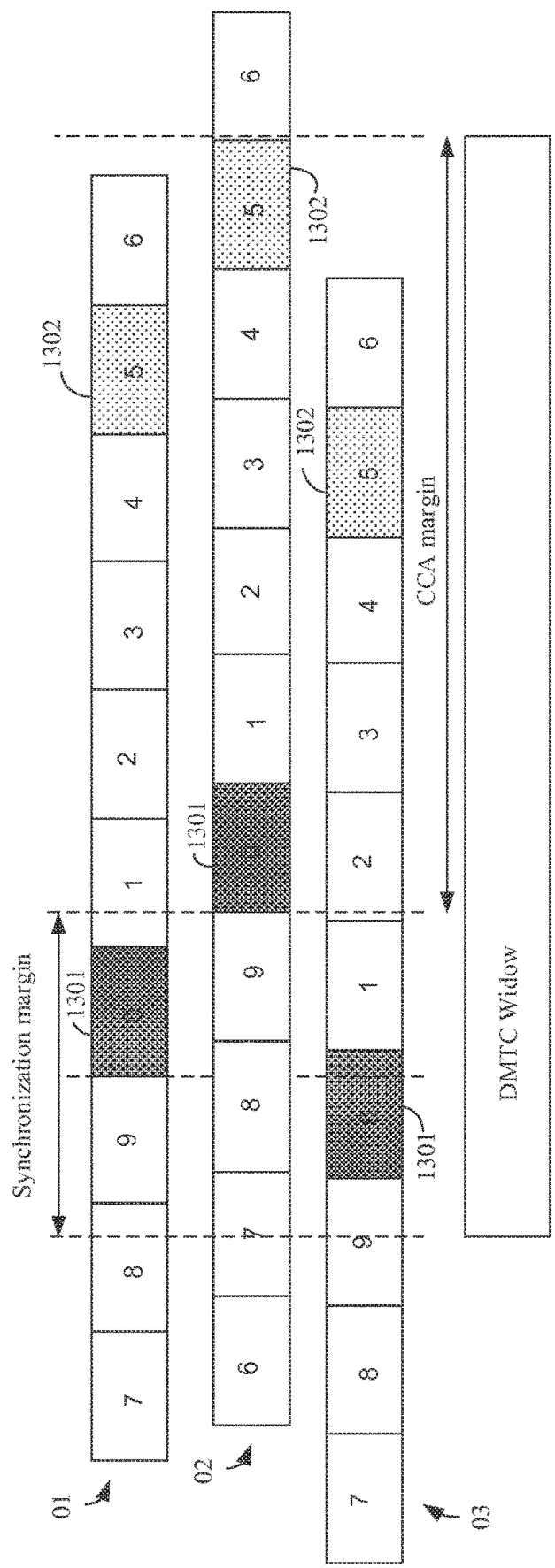
FIG. 13 is a schematic drawing illustrating a timing example where the LBT success probability is low and thus the LBT margin is the time to the next allowed DRS occasion, subframe 5 in this case, plus the length of the DRS occasion according to one embodiment of the teachings disclosed herein.

FIG. 13 shows an example where the LBT success probability is low and thus the LBT margin is the time to the next allowed DRS occasion, subframe 5 in this case, plus the length of the DRS occasion.

Figure 14:
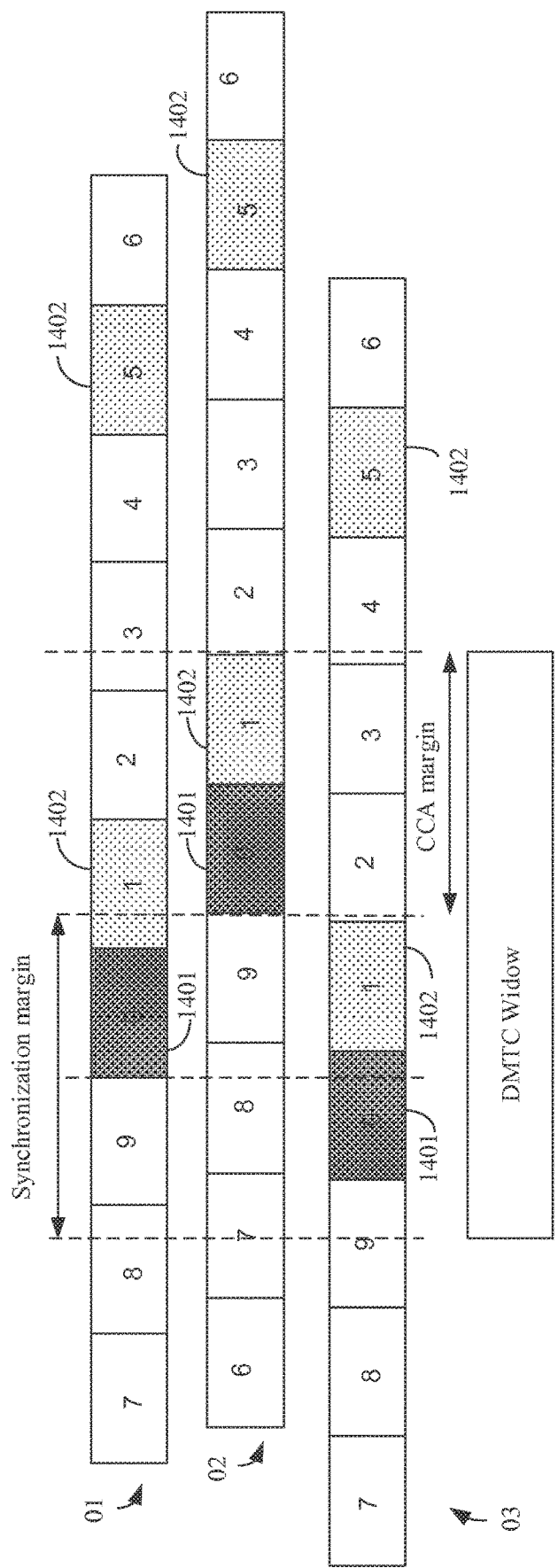
FIG. 14 is a schematic drawing illustrating a timing example where the LBT success probability is low and thus the LBT margin is the time to the next allowed DRS occasion, subframe 1 in this case, plus the length of the DRS occasion according to one embodiment of the teachings disclosed herein.

The NW is synchronized within +/−1.2 ms. The LBT probability is low (estimated by load measurements or historical LBT success statistics) and thus it is not expected that the DRS can be transmitted in its nominal position. In this case the next available subframe for DRS transmission is subframe 1302 and thus the LBT margin is five subframes plus the length of the DRS (1 subframe) i.e. six subframes. FIG. 14 shows an example where the LBT success probability is low and thus the LBT margin is the time to the next allowed DRS occasion, subframe 1 in this case, plus the length of the DRS occasion.

Here the NW is synchronized within +/−1.2 ms. The LBT probability is low (estimated by load measurements or historical LBT success statistics) and thus it is not expected that the DRS can be transmitted in its nominal position. In this case the next available subframe for DRS transmission is subframe 1401 and thus the LBT margin is one subframe plus the length of the DRS (1 subframe) i.e. two subframes.

Figure 15:
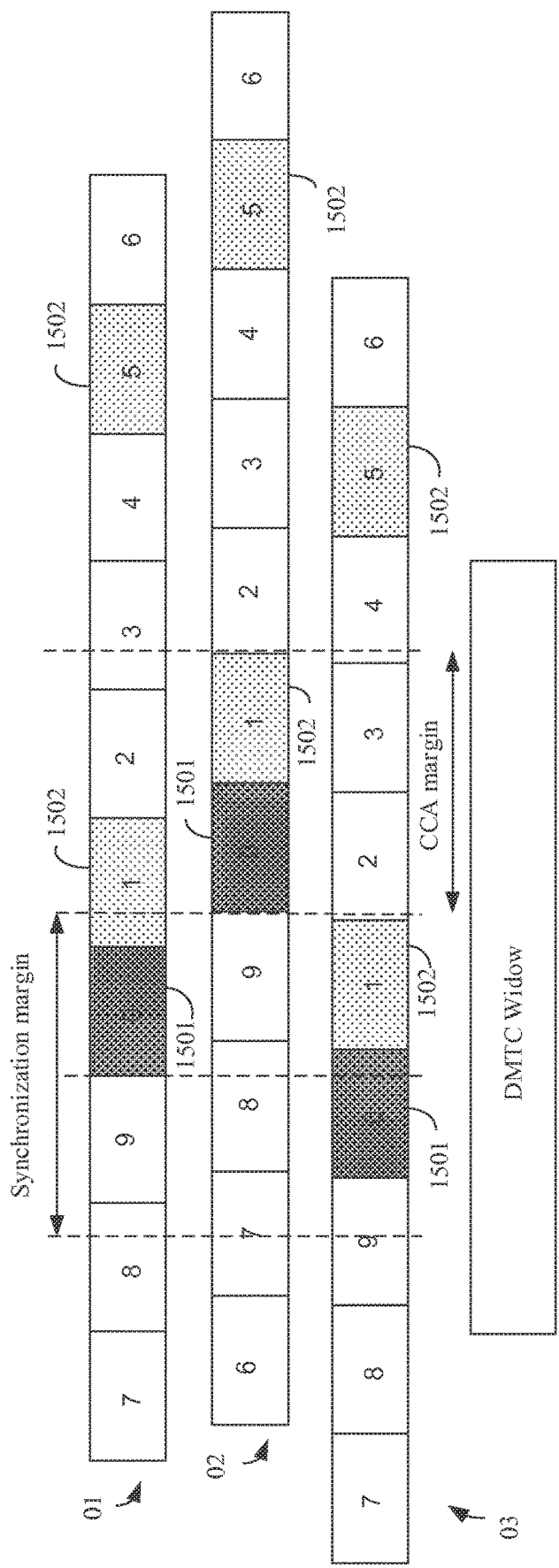
FIG. 15 is a schematic drawing illustrating a timing example where the LBT success probability is low and thus the LBT margin is the time to the next allowed DRS occasion, subframe 1 in this case, plus the length of the DRS occasion.

In another embodiment the start and end of the DMTC window are aligned to the subframes of the serving cell as illustrated in FIG. 15 which shows an example where the LBT success probability is low and thus the LBT margin is the time to the next allowed DRS occasion, subframe 1 (subframe 1501) in this case, plus the length of the DRS occasion. Here the start and end of the DMTC window are aligned to the serving cells subframe borders. The scenario illustrated by FIG. 15 differs from that illustrated in FIG. 14 since the DMTC is aligned with the borders of the serving cells subframe.

In the extreme case of no NW synchronization the DMTC window will be equal to the DRS periodicity.

EMBODIMENTS

One embodiment relates to a method implemented in a network node for adaptive discovery signal measurement timing configuration, the method comprising:
  assessing the expected channel access delay;
  assessing the degree of NW synchronization;
  determining a suitable DMTC window length;
  notifying UEs in RRC Connected state about the change;
  updating system information with the new DMTC window configuration; and
  paging UEs to reread system information.

One embodiment relates to an arrangement, such as a network node, for adaptive discovery signal measurement timing configuration, the arrangement being configured for
  assessing the expected channel access delay;
  assessing the degree of NW synchronization;
  determining a suitable DMTC window length;
  notifying UEs in RRC Connected state about the change;
  updating system information with the new DMTC window configuration; and
  paging UEs to reread system information.

One embodiment relates to a method implemented in a network node for adjusting the length of a search window, in which a wireless device is required to search for signals from other network nodes, comprising the steps of:
  determining the degree of synchronization of the network;
  estimating the expected delay to acquire the channel;
  determining the search window length; and
  informing the wireless device of the search window length.

In one embodiment determining the degree of synchronization of the network is based on which synchronization method the network uses.

In one embodiment determining the degree of synchronization of the network is based on measurements of the degree of synchronization using e.g. signals from other network nodes.

In one embodiment determining the degree of synchronization of the network is based on UE measurements of relative timing between nodes.

In one embodiment estimating the expected delay to acquire the channel is based on historical clear channel assessment success rate.

In one embodiment estimating the expected delay to acquire the channel is based on measured interference level.

In one embodiment estimating the expected delay to acquire the channel is based on measured channel occupancy of other nodes.

In one embodiment determining the search window length is made taking degree of synchronization into account.

In one embodiment determining the search window length is made taking the expected delay to acquire the channel into account.

In one embodiment determining the search window length is made taking the target success rate for transmission of control signals in the search window into account In one embodiment informing the wireless device of the search window length is done using dedicated signaling.

In one embodiment informing the wireless device of the search window length is done using broadcast signaling.

In one embodiment the search window is an LTE DMTC window.

In one embodiment the control signal is a DRS signal.

The invention claimed is:

1. A method implemented in a network node configured to operate in a wireless network for adjusting a length of a discovery measurement timing configuration (DMTC) window in which a wireless communication device served by at least the network node receives discovery signals from other network nodes, wherein the method is performed by the network node and comprises the steps of:
  determining a degree of synchronization between nodes of the network, wherein the determined degree of synchronization between nodes is one of a plurality of different possible degrees of synchronization;
  estimating an expected delay for the wireless communication device to acquire a channel within the network;
  determining the DMTC window length based on at least one of the determined degree of synchronization and the estimated expected delay for the wireless communication device to acquire the channel within the network; and
  informing the wireless communication device of the determined DMTC window length.

2. The method according to claim 1, wherein determining the degree of synchronization of the network is based on which synchronization method the network uses.

3. The method according to claim 1, wherein determining the degree of synchronization of the network is based on measurements of the degree of synchronization using signals from other network nodes.

4. The method according to claim 1, wherein determining the degree of synchronization of the network is based on measurements performed by the wireless communication device of relative timing between nodes.

5. The method according to claim 1, wherein estimating the expected delay to acquire the channel is based on historical clear channel assessment success rate.

6. The method according to claim 1, wherein estimating the expected delay to acquire the channel is based on a measured interference level.

7. The method according to claim 1, wherein estimating the expected delay to acquire the channel is based on measured channel occupancy of other nodes.

8. The method according to claim 1, wherein determining the DMTC window length is made taking a target success rate for transmission of control signals in the DMTC window into account.

9. The method according to claim 1, wherein the wireless communication device is in RRC connected state and is notified about a change of the DMTC window length, and wherein informing the wireless communication device of the DMTC window length is done using dedicated signaling.

10. The method according to claim 1, the wireless communication device is in RRC IDLE state and is notified about a change of the DMTC window length, wherein a system information is updated with the determined DMTC window length and wherein informing the wireless device of the DMTC window length is done using broadcast signaling to reread the system information.

11. The method according to claim 1, wherein the DMTC window is a long term evolution (LTE) DMTC window.

12. The method according to claim 8, wherein the control signals is a discovery reference signal (DRS).

13. The method of claim 1, wherein the plurality of different possible degrees of synchronization comprises at least two of:
a first synchronization level representing a high degree of synchronization between nodes;
a second synchronization level representing a coarse degree of synchronization between nodes; and
a third synchronization level representing absence of synchronization.

14. An arrangement of a network node configured to operate in a wireless network, wherein the arrangement is for adjusting a length of a discovery measurement timing configuration (DMTC) window in which a wireless communication device served by at least the network node receives discovery signals from other network nodes, wherein the arrangement comprises:
a transceiver; and
a controller,
wherein the controller is configured to:
determine a degree of synchronization between nodes of the network, wherein the determined degree of synchronization between nodes is one of a plurality of different possible degrees of synchronization of the network;
estimate an expected delay for the wireless communication device to acquire a channel within the network;
determine the DMTC window length based on at least one of the determined degree of synchronization and the estimated expected delay for the wireless communication device to acquire the channel within the network; and
inform the wireless communication device of the determined DMTC window length.

15. The arrangement according to claim 14, wherein the controller is further configured to cause determination of the degree of synchronization of the network based on which synchronization method the network uses.

16. The arrangement according to claim 14, wherein the controller is further configured to cause determination of the degree of synchronization of the network based on measurements of the degree of synchronization using signals from other network nodes.

17. The arrangement according to claim 14, wherein the controller is further configured to cause determination of the degree of synchronization of the network based on measurements performed by the wireless communication device of relative timing between nodes.

18. The arrangement according to claim 14, wherein the controller is further configured to cause estimation of the expected delay to acquire the channel based on historical clear channel assessment success rate.

19. The arrangement according to claim 14, wherein the controller is further configured to cause estimation of expected delay to acquire the channel based on a measured interference level.

20. The arrangement according to claim 14, wherein the controller is further configured to cause estimation of expected delay to acquire the channel based on measured channel occupancy of other nodes.

21. The arrangement according to claim 14, wherein the controller is further configured to cause determination of the DMTC window length by taking a target success rate for transmission of control signals in the DMTC window into account.

22. The arrangement according to claim 21, wherein the control signal is a discovery reference signal (DRS).

23. The arrangement according to claim 14, wherein the wireless communication device is in radio resource control Connected state and is notified about a change of the DMTC window length, and wherein the controller is further configured to cause the information of the wireless communication device of the DMTC window length by using dedicated signaling.

24. The arrangement according to claim 14, wherein the wireless communication device is in radio resource control IDLE state and is notified about a change of the DMTC window length, wherein the controller is configured to update a system information with the determined DMTC window length, and wherein the controller is further configured to cause the information of wireless communication device of the DMTC window length by paging the wireless communication device using broadcast signaling to reread the system information.

25. The arrangement according to claim 14, wherein the DMTC window is a long term evolution (LTE) DMTC window.

26. A network node comprising the arrangement according to claim 14.

27. The arrangement of claim 14, wherein the plurality of different possible degrees of synchronization comprises at least two of:
a first synchronization level representing a high degree of synchronization between nodes;

a second synchronization level representing a coarse degree of synchronization between nodes; and a third synchronization level representing absence of synchronization.

28. A non-transitory computer readable medium having stored thereon a computer program comprising program instructions that, when run by a data-processing unit, cause the data-processing unit to execute a method in a network node configured to operate in a wireless network for adjusting a length of a discovery measurement timing configuration (DMTC) window in which a wireless communication device served by at least the network node receives discovery signals from other network nodes, wherein the method comprises:

determining a degree of synchronization between nodes of the network, wherein the determined degree of synchronization between nodes is one of a plurality of different possible degrees of synchronization;

estimating an expected delay for the wireless communication device to acquire a channel within the network;

determining the DMTC window length based on at least one of the determined degree of synchronization and the estimated expected delay for the wireless communication device to acquire the channel within the network; and informing the wireless communication device of the determined DMTC window length.

29. The non-transitory computer-readable medium of claim 28, wherein the plurality of different possible degrees of synchronization comprises at least two of:

a first synchronization level representing a high degree of synchronization between nodes;

a second synchronization level representing a coarse degree of synchronization between nodes; and a third synchronization level representing absence of synchronization.

* * * * *